No. 767,291.

Patented August 9, 1904.

UNITED STATES PATENT OFFICE.

EMIL KNOEVENAGEL, OF HEIDELBERG, GERMANY.

PROCESS OF MAKING ODORIFEROUS COMPOUND.

SPECIFICATION forming part of Letters Patent No. 767,291, dated August 9, 1904.

Application filed September 21, 1903. Serial No. 174,110. (No specimens.)

*To all whom it may concern:*

Be it known that I, EMIL KNOEVENAGEL, professor, a subject of the German Emperor, residing at Heidelberg, in the Grand Duchy of Baden, Germany, (whose post-office address is 28 Zähringerstrasse, Heidelberg, Germany,) have invented a Process for the Manufacture of an Odoriferous Compound, (for which I have applied for a patent in Germany on the 22d of August, 1902,) of which the following is a specification.

It is known (through the German Patent No. 94,132) that citrylidene-aceto-acetic ester may be obtained by the condensation of citral with aceto-acetic ester. The said product when subjected to fractional distillation at a pressure equal to twenty millimeters of mercury column boils approximately at 190° centigrade, and its specific gravity at 19° centigrade is 1.0202. C. F. Sehler (according to his dissertation published in 1897) made the observation that after the ester has been fractionated four or five times the boiling-point at a pressure equal to eighteen millimeters of mercury lie approximately at 178° centigrade, and its specific gravity at 16° centigrade was 1.0103. On inverting by the methods of inversion commonly used for the citral series—for instance, by means of sulfuric acid (according to German Patents Nos. 124,227 and 124,228)—the ester thus obtained will not yield a product suitable for perfumery. It has been discovered, however, that a perfume may be obtained if the fractioned or unfractioned ester is first heated to about 160° centigrade for several hours, with or without the addition of water, thereby raising the specific gravity to about 1.03, (at 20° centigrade,) at the same time isomerizing the ester and lowering the boiling-point, and then the product is inverted in the known manner. After these preliminary explanations the process for the production of the perfume may be described as follows:

The citrylidene-aceto-acetic ester is heated to about 160° centigrade, with or without the addition of water, for four to five hours, after which one part of the isomerized ester is caused to flow upon five to six parts of sulfuric acid of eighty per cent., preferably at a temperature below zero, (of the centigrade thermometer.) After the inversion, which will have been accomplished in about three hours, the product is poured upon ice, absorbed by ether, and then distilled in a current of steam, thereby causing the perfume or odoriferous compound to pass over slowly. It is then separated from water and subjected to fractional distillation. All the vapors which pass over between 150° and 190° at twelve-millimeter pressure may be utilized for perfumery. The same conversion of the ester into the perfume or odoriferous product may, of course, be effected by other mineral acids—such as hydrochloric (or other halogen-hydrogen) acid, phosphoric acid, nitric acid, or by strong organic acids, such as oxalic acid, or by acid salts having oxidizing properties, such as chlorid of iron. The conversion may be effected also by adding halogen-hydrogen to the isomerized ester and then separating it again by known methods, preferably by means of soda or potash solution. For instance, two parts of a sixteen-per-cent. glacial acetic hydrobromic acid are caused to flow into one part of the isomerized citrylidene-aceto-acetic ester, while carefully cooling the same. When the mixture has been allowed to stand for some time, the glacial acetic acid is removed by means of water-and-soda solution. The remaining hydrobromid yields, on boiling with alkalies or earthy alkalies or with tertiary organic bases or with salts having an alkaline reaction, such as dilute potash solution or soda solution, the same perfume which is obtainable by inversion with sulfuric acid.

The perfume or odoriferous compound obtained by the process described above seems to be a mixture of several isomeric compounds. At a pressure of twelve millimeters it boils between 140° and 170° centigrade. At 20° centigrade its specific gravity is between 1.00 and 1.04. Its odor resembles most closely that of lupins, but has also some similarity to that of ionone.

What I claim is—

1. The improvement in the manufacture of an odoriferous compound from the product of the condensation of citral with aceto-acetic ester, which consists in subjecting the said product to a high temperature for several hours and then inverting it, substantially as described.

2. The improvement in the manufacture of an odoriferous compound from the product of the condensation of citral with aceto-acetic ester, which consists in subjecting the product of the condensation of citral with aceto-acetic ester to a high temperature for several hours and then inverting it by treatment with a mineral acid, substantially as described.

3. The improvement in the manufacture of an odoriferous compound from the product of the condensation of citral with aceto-acetic ester, which consists in subjecting the product of the condensation of citral with aceto-acetic ester to a high temperature for several hours and then inverting it by treatment with a sulfuric acid, pouring the product thus obtained upon ice, absorbing it with ether and distilling, substantially as described.

4. The improvement in the manufacture of an odoriferous compound from the product of the condensation of citral with aceto-acetic ester, which consists in subjecting the product of the condensation of citral with aceto-acetic ester to a high temperature for several hours and then inverting it by treatment with sulfuric acid, pouring the product thus obtained upon ice, absorbing it with ether, distilling in a current of steam, relieving the distillate of water and subjecting it to fractional distillation, substantially as described.

In witness whereof I have hereunto signed my name in the presence of two subscribing witnesses.

EMIL KNOEVENAGEL.

Witnesses:
ALBERT KNOLL,
JACOB ADRIAN.